United States Patent
Iura et al.

(10) Patent No.: US 7,843,161 B2
(45) Date of Patent: Nov. 30, 2010

(54) INVERTER DEVICE

(75) Inventors: Hideaki Iura, Kitakyushu (JP); Masanobu Inazumi, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 344 days.

(21) Appl. No.: 11/989,535

(22) PCT Filed: Jul. 11, 2006

(86) PCT No.: PCT/JP2006/313720

§ 371 (c)(1), (2), (4) Date: Jan. 28, 2008

(87) PCT Pub. No.: WO2007/013291

PCT Pub. Date: Feb. 1, 2007

(65) Prior Publication Data

US 2009/0140688 A1  Jun. 4, 2009

(30) Foreign Application Priority Data

Jul. 27, 2005  (JP) .............................. 2005-217735

(51) Int. Cl.
*H02P 27/04* (2006.01)

(52) U.S. Cl. .................. 318/801; 318/807; 318/432

(58) Field of Classification Search .................. 318/801, 318/807, 432, 434, 708, 400.02, 706
See application file for complete search history.

(56) References Cited

U.S. PATENT DOCUMENTS

2006/0049795 A1 *  3/2006  Iura et al. .................... 318/807

FOREIGN PATENT DOCUMENTS

| JP | 09-294390 A | 11/1997 |
|----|-------------|---------|
| JP | 2004-064902 A | 2/2004 |
| JP | 2005-151635 A | 6/2005 |

* cited by examiner

*Primary Examiner*—Karen Masih
(74) *Attorney, Agent, or Firm*—Sughrue Mion, PLLC

(57) ABSTRACT

This invention provides an inverter device that can detect a step-out state of an AC motor by a simple process without depending on a rotation speed of the AC motor and also surely hold an abnormal state in the step-out state of the AC motor. The inverter device 1 includes a torque current control unit 6 for controlling a torque current direction voltage so that a given torque current command value coincides with a torque current detection value, and a V/f conversion unit 7 for calculating an induced voltage command of the AC motor 2 based on a given output frequency command. The inverter device further includes a step-out detection unit 10 for detecting a step-out state of the AC motor 2 based on the torque current direction voltage and the induced voltage command.

5 Claims, 3 Drawing Sheets

INVERTER DEVICE

TECHNICAL FIELD

The present invention relates to an inverter device that detects a step-out state of an AC motor without a position detector or a speed detector thereby to protect the AC motor.

BACKGROUND ART

A step-out detection device of a sensorless synchronous motor has been proposed in the related art (for example, Patent Document 1). A driving device of the sensorless synchronous motor applies a three-phase AC voltage to stator windings, generates torque by using the interaction between current flowing through the stator windings and magnetic fields caused by permanent magnets of a rotor, and then is rotated. The step-out detection device of the sensorless synchronous motor includes the structure that detects step-out when a detection level of an effective value of current of the stator windings is set, the effective value of the current of the stator windings exceeds the detection level, and a power factor angle between a voltage applied to the stator windings and the current flowing through the stator windings is close to 90°.

Patent Document 1: JP-A-9-294390 (see pages 2 to 4, FIGS. 1 and 2)

DISCLOSURE OF THE INVENTION

Problem that the Invention is to Solve

However, in the step-out detection device of the sensorless synchronous motor in the related art, the accuracy of the three-phase AC voltage applied to the stator windings becomes problematic in a low-speed region, and then it is difficult to correctly detect the power factor angle between the applied voltage and the current flowing through the stator windings. For this reason, it is not possible to detect the step-out. Further, there is a problem in that it is not possible to detect the step-out because current flows by the current control so as to comply with an instruction despite the step-out state of the AC motor.

The invention has been made in view of the above-described problem, and an object of the invention provides an inverter device that can detect a step-out state of an AC motor by a simple process without depending on the rotation speed of the AC motor, and surely hold an abnormal state in the step-out state of the AC motor.

Means for Solving the Problem

In order to solve the above-mentioned problem, the invention provides the following structure.

According to a first aspect of the present invention, in an inverter device that drives an AC motor without a position detector or a speed detector of a rotor, the inverter device includes:

a torque current control unit for controlling a torque current direction voltage so that a given torque current command value coincides with a torque current detection value;

a V/f conversion unit for calculating an induced voltage command of the AC motor based on a given output frequency command; and a step-out detection unit for detecting a step-out state of the AC motor based on the torque current direction voltage and the induced voltage command.

According to a second aspect of the present invention, the step-out detection unit as set forth in the first aspect may compare a sum of the torque current direction voltage and the induced voltage command with a ratio to the induced voltage command. When the sum is equal to or smaller than the ratio to the induced voltage command, the step-out detection unit may detect that the AC motor is in the step-out state.

According to a third aspect of the present invention, in an inverter device that drives an AC motor without a position detector or a speed detector of a rotor, the inverter device includes:

an exciting current control unit for controlling an exciting current direction voltage so that a given exciting current command value coincides with an exciting current detection value;

a V/f conversion unit for calculating an induced voltage command of the AC motor based on a given output frequency command; and a step-out detection unit for detecting a step-out state of the AC motor based on the exciting current direction voltage and the induced voltage command.

According to a fourth aspect of the present invention, the step-out detection unit as set forth in the third aspect may compare a sum of the exciting current direction voltage and the induced voltage command with a ratio to the induced voltage command. When the sum is equal to or smaller than the ratio to the induced voltage command, the step-out detection unit may detect that the AC motor is in the step-out state.

According to a fifth aspect of the present invention, in the first or third aspect, when it is detected that the AC motor is in the step-out state, the inverter device may be abnormally stopped, an abnormal signal may be output, or an abnormal state may be displayed.

ADVANTAGE OF THE INVENTION

According to the first or third aspect, it is possible to detect the step-out state of the AC motor without depending on the rotation speed of the AC motor, so that it is possible to protect the AC motor and the inverter device. Furthermore, it is possible to protect a system that includes a device driven by the AC motor.

In addition, according to the second or fourth aspect, it is possible to detect the step-out state of the AC motor by a simple process. Further, it is possible to reduce the calculation load of software. Furthermore, since the simple process can be performed using an inexpensive CPU, it is possible to make the inverter device at low cost. In addition, since an inexpensive CPU may be used, it is possible to also improve generality.

Further, according to the fifth aspect, since the abnormal state of the inverter device is held, it is possible to prevent the AC motor from being driven in the step-out state. Furthermore, it is possible to improve the reliability of the entire system.

DESCRIPTION OF REFERENCE NUMERALS AND SIGNS

Figure 1:
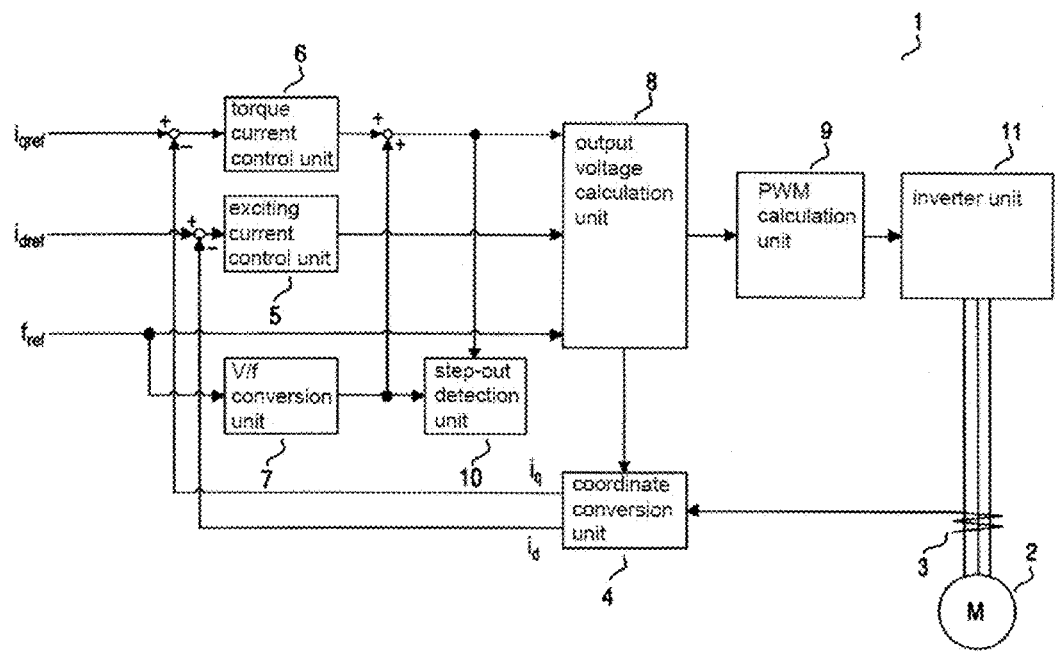
FIG. 1 is a block diagram showing an inverter device according to a first embodiment of the present invention.

1: inverter device
2: AC motor
3: current detection unit
4: coordinate conversion unit
5: exciting current control unit
6: torque current control unit
7: V/f conversion unit
8: output voltage calculation unit
9: PWM calculation unit
10: step-out detection unit
11: inverter unit

BEST MODE FOR CARRYING OUT THE INVENTION

Preferred embodiments of the present invention will be described below with reference to accompanying drawings.

First Embodiment

FIG. 1 is a block diagram showing an inverter device according to a first embodiment of the present invention. In FIG. 1, reference numeral 1 indicates an inverter device, reference numeral 2 indicates an AC motor, reference numeral 3 indicates a current detection unit, reference numeral 4 indicates a coordinate conversion unit, reference numeral 5 indicates an exciting current control unit, reference numeral 6 indicates a torque current control unit, reference numeral 7 indicates a V/f conversion unit, reference numeral 8 indicates an output voltage calculation unit, reference numeral 9 indicates a PWM calculation unit, reference numeral 10 indicates a step-out detection unit, and reference numeral 11 indicates an inverter unit. The present invention is different from Patent Document 1 in that an inverter device of the present invention includes the step-out detection unit for detecting a step-out state of an AC motor based on an exciting current command value or a torque current direction voltage, and an induced voltage command.

The inverter unit 11 supplies electric power to the AC motor 2. The current detection unit 3 detects current flowing through the AC motor 2. The coordinate conversion unit 4 converts the current, which is detected by the current detection unit 3, into an exciting current detection value $I_d$ and a torque current detection value $I_q$, and then outputs these values. The exciting current control unit 5 performs a control so that a given exciting current command $I_{dref}$ coincides with the exciting current detection value $I_d$, and then outputs an exciting current direction voltage. The torque current control unit 6 performs a control so that a given torque current command $I_{qref}$ coincides with the torque current detection value $I_q$, and then outputs a torque current direction voltage. The V/f conversion unit 7 outputs an induced voltage command based on a given frequency command $f_{ref}$ and an induced voltage constant of the AC motor 2. The output voltage calculation unit 8 inputs a sum of the induced voltage command and the torque current direction voltage, the exciting current direction voltage, and the given frequency command $f_{ref}$ respectively. Then, the output voltage calculation unit 8 calculates an output voltage, and then outputs the output voltage. The PWM calculation unit 9 determines a switching pattern of the inverter unit 11 based on the output voltage command that is output from the output voltage calculation unit 8.

The step-out detection unit 10 inputs the induced voltage command, and the sum of the induced voltage command and the torque current direction voltage. The step-out detection unit calculates a multiplied value, which is obtained by multiplying a predetermined coefficient by the induced voltage command, as a ratio to the induced voltage command. Then, the step-out detection unit compares the multiplied value with the above-mentioned sum. When the sum is equal to or smaller than the ratio to the induced voltage command, the step-out detection unit detects that the AC motor 2 is in the step-out state. Further, the step-out detection unit abnormally stops the inverter device 1, outputs an abnormal signal, or displays an abnormal state. When the multiplied value is larger than the ratio to the induced voltage command, the step-out detection unit intermits a normal operation.

In this case, the reason why it can be detected that the AC motor 2 is in the step-out state when the sum of the induced voltage command and the torque current direction voltage is equal to or smaller than the ratio to the induced voltage command will be described below.

When the AC motor 2 is normally driven, a ratio between the induced voltage and the frequency of the AC motor 2 becomes constant. However, when the AC motor 2 is in the step-out state, the induced voltage disappears. For this reason, large current flows due to the difference between a given induced voltage command and the induced voltage. In this case, the torque current control unit 6 outputs a voltage for controlling the induced voltage command. Therefore, the torque current detection value and the exciting current detection value are controlled by the given torque current command value and the given exciting current command value. However, at this time, the sum of the induced voltage command and the torque current direction voltage, which is the output of the torque current control unit 6, becomes smaller than the induced voltage command. Basically, the torque current direction voltage includes the voltage drop of the component of the inductance or the resistance of the AC motor 2. Accordingly, if the ratio to the induced voltage command is predetermined in consideration of the voltage drop, it is possible to detect the step-out state when the sum of the induced voltage command and the torque current direction voltage is equal to or smaller than the ratio to the induced voltage command.

Since not the voltage detection value or the current detection value but the command value is used as described above, it is possible to detect the step-out state of the AC motor 2 by a simple process without depending on the rotation speed of the AC motor 2.

Further, after it is detected that the AC motor 2 is in the step-out state, the abnormal state of the inverter device 1 is held. Therefore, it is possible to prevent the AC motor 2 from being driven in the step-out state.

In this embodiment, even when compensation terms of an exciting current direction voltage and a torque current direction voltage that correspond to a motor constant of the AC motor are added, it is possible to detect the step-out likewise.

Even in the case of a control configuration (not shown) further including the compensation terms, which calculate the voltage drop of the component of the inductance or the resistance of the AC motor 2 for each of the exciting current direction voltage component and the torque current direction voltage component, add the exciting current direction voltage component of the above-mentioned voltage drop to the exciting current direction voltage, and then add the torque current direction voltage component of the above-mentioned voltage drop to the torque current direction voltage, when the AC motor 2 is in the step-out state, the sum of the induced voltage command and the torque current direction voltage is equal to or smaller than the ratio to the predetermined induced voltage command. Accordingly, it is possible to detect the step-out likewise.

Second Embodiment

Figure 2:
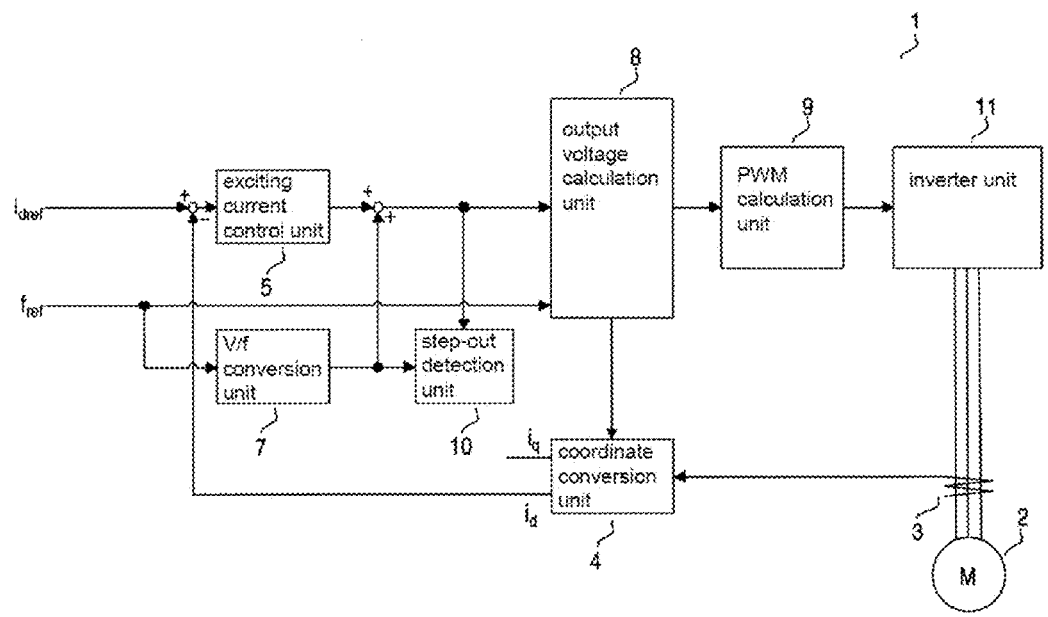
FIG. 2 is a block diagram showing an inverter device according to a second embodiment of the present invention.

FIG. 2 is a block diagram showing an inverter device according to a second embodiment of the present invention. In FIG. 2, this embodiment is different from the inverter device according to the first embodiment of the invention in that an inverter device does not include the torque current control unit 6, and other configuration of this embodiment is the same as the configuration of the first embodiment. The sum of the induced voltage command output from the V/f conversion unit 7 and the exciting current direction voltage output from the exciting current control unit 5, and a given frequency command are inputted in the output voltage calculation unit 8. Then, the output voltage calculation unit 8 calculates an output voltage, and then outputs the output voltage.

The step-out detection unit 10 inputs the induced voltage command, and the sum of the induced voltage command and the exciting current direction voltage. The step-out detection unit calculates a multiplied value, which is obtained by multiplying a predetermined coefficient by the induced voltage command, as a ratio to the induced voltage command. Then, the step-out detection unit compares the multiplied value with the above-mentioned sum. When the sum is equal to or smaller than the ratio to the induced voltage command, the step-out detection unit detects that the AC motor 2 is in the step-out state. Further, the step-out detection unit abnormally stops the inverter device 1, outputs an abnormal signal, or displays an abnormal state. When the multiplied value is larger than the ratio to the induced voltage command, the step-out detection unit intermits a normal operation.

In this case, the reason why it can be detected that the AC motor 2 is in the step-out state when the sum of the induced voltage command and the exciting current direction voltage is equal to or smaller than the ratio to the induced voltage command will be described below.

When the AC motor 2 is normally driven, a ratio between the induced voltage and the frequency of the AC motor 2 becomes constant. However, when the AC motor 2 is in the step-out state, the induced voltage disappears. For this reason, large current flows due to the difference between the given induced voltage command and the induced voltage. In this case, the exciting current control unit 5 outputs a voltage for controlling the induced voltage command. Therefore, the exciting current detection value is controlled by the given exciting current command value. However, at this time, the sum of the induced voltage command and the exciting current direction voltage, which is the output of the exciting current control unit 5, becomes smaller than the induced voltage command. Basically, the exciting current direction voltage includes the voltage drop of the component of the inductance or the resistance of the AC motor 2. Accordingly, if the ratio to the induced voltage command is predetermined in consideration of the voltage drop, it is possible to detect the step-out state when the sum of the induced voltage command and the exciting current direction voltage is equal to or smaller than the ratio to the induced voltage command.

Since not the voltage detection value or the current detection value but the command value is used as described above, it is possible to detect the step-out state of the AC motor 2 by a simple process without depending on the rotation speed of the AC motor 2.

Further, after it is detected that the AC motor 2 is in the step-out state, the abnormal state of the inverter device 1 is held. Therefore, it is possible to prevent the AC motor 2 from being driven in the step-out state.

Third Embodiment

Figure 3:
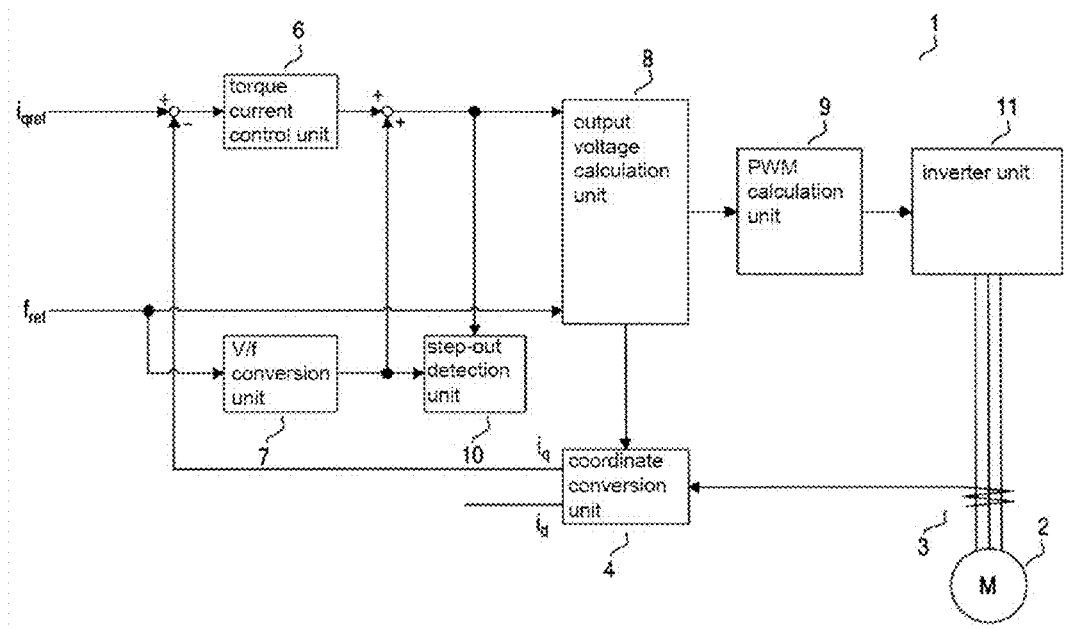
FIG. 3 is a block diagram showing an inverter device according to a third embodiment of the present invention.

FIG. 3 is a block diagram showing an inverter device according to a third embodiment of the present invention. In FIG. 3, this embodiment is different from the inverter device according to the first embodiment of the present invention in that a device does not include the exciting current control unit 5, and other configuration of this embodiment is the same as the configuration of the first embodiment. The sum of the induced voltage command output from the V/f conversion unit 7 and the torque current direction voltage output from the torque current control unit 6, and a given frequency command are inputted in the output voltage calculation unit 8. The output voltage calculation unit 8 calculates an output voltage, and then outputs the output voltage.

The step-out detection unit 10 inputs the induced voltage command, and a sum of the induced voltage command and the torque current direction voltage. The step-out detection unit calculates a multiplied value, which is obtained by multiplying a predetermined coefficient by the induced voltage command, as a ratio to the induced voltage command. Then, the step-out detection unit compares the multiplied value with the above-mentioned sum. When the sum is equal to or smaller than the ratio to the induced voltage command, the step-out detection unit detects that the AC motor 2 is in the step-out state. Further, the step-out detection unit abnormally stops the inverter device 1, outputs an abnormal signal, or displays an abnormal state. When the multiplied value is larger than the ratio to the induced voltage command, the step-out detection unit intermits a normal operation.

In this case, the reason why it can be detected that the AC motor 2 is in the step-out state when the sum of the induced voltage command and the torque current direction voltage is equal to or smaller than the ratio to the induced voltage command is the same as that of the first embodiment.

Since not the voltage detection value or the current detection value but the command value is used as described above, it is possible to detect the step-out state of the AC motor 2 by a simple process without depending on the rotation speed of the AC motor 2.

Further, after it is detected that the AC motor 2 is in the step-out state, the abnormal state of the inverter device 1 is held. Therefore, it is possible to prevent the AC motor 2 from being driven in the step-out state.

INDUSTRIAL APPLICABILITY

The present invention may be applied to detect the step-out of an induction motor as well as a synchronous motor as an AC motor.

Further, when the motor constant of an AC motor is abnormally predetermined, it is possible to also protect the AC motor using the present invention.

Furthermore, it is possible to protect an AC motor, and to also protect a system that includes a device driven by an AC motor or an inverter device.

The invention claimed is:

1. An inverter device that drives an AC motor without a position detector or a speed detector of a rotor, the inverter device comprising:
    a torque current control unit for controlling a torque current direction voltage so that a given torque current command value coincides with a torque current detection value;
    a V/f conversion unit for calculating an induced voltage command of the AC motor based on a given output frequency command; and a step-out detection unit for detecting a step-out state of the AC motor based on the torque current direction voltage and the induced voltage command.

2. The inverter device according to claim 1, wherein the step-out detection unit compares a sum of the torque current direction voltage and the induced voltage command with a ratio to the induced voltage command, and when the sum is equal to or smaller than the ratio to the induced voltage command, the step-out detection unit detects that the AC motor is in the step-out state.

3. An inverter device that drives an AC motor without a position detector or a speed detector of a rotor, the inverter device comprising:

an exciting current control unit for controlling an exciting current direction voltage so that a given exciting current command value coincides with an exciting current detection value;

a V/f conversion unit for calculating an induced voltage command of the AC motor based on a given output frequency command; and a step-out detection unit for detecting a step-out state of the AC motor based on the exciting current direction voltage and the induced voltage command.

4. The inverter device according to claim 1 or 3, wherein when it is detected that the AC motor is in the step-out state, the inverter device is abnormally stopped, an abnormal signal is output, or an abnormal state is displayed.

5. The inverter device according to claim 3, wherein the step-out detection unit compares a sum of the exciting current direction voltage and the induced voltage command with a ratio to the induced voltage command, and when the sum is equal to or smaller than the ratio to the induced voltage command, the step-out detection unit detects that the AC motor is in the step-out state.

* * * * *